United States Patent [19]

Iijima

[11] 3,952,613
[45] Apr. 27, 1976

[54] CHANGE-SPEED TRANSMISSION FOR A PASSENGER AUTOMOBILE

[75] Inventor: Tetsuya Iijima, Tokyo, Japan

[73] Assignee: Nissan Motor Company Limited, Yokohama, Japan

[22] Filed: June 18, 1974

[21] Appl. No.: 480,520

[30] Foreign Application Priority Data

June 20, 1973 Japan............... 48-68663

[52] U.S. Cl..................... 74/759; 74/769
[51] Int. Cl.².................... F16H 57/10
[58] Field of Search........... 74/759, 758, 769, 768

[56] References Cited
UNITED STATES PATENTS

| 3,022,683 | 2/1962 | Simon | 74/759 |
|---|---|---|---|
| 3,820,418 | 6/1974 | Ott | 74/759 |

*Primary Examiner*—Samuel Scott
*Assistant Examiner*—Lance W. Chandler

[57] ABSTRACT

A change-speed transmission for a passenger automobile has a compound gear train which gives four forward speeds and a reverse. The compound gear train includes two basic planetary gearsets and a dual-pinions planetary gearset located between the two basic planetary gear sets. All the ring gears are connected with each other for simultaneous rotation and act as a reaction member, to provide a first forward speed, for one basic planetary gearset which has a carrier as an output, sun gear of which being connected to carrier of the dual-pinions planetary gearset, the sun gear of the one basic planetary gearset and the carrier of the dual-pinions planetary gearset being connectable to an input during all forward speeds. Sun gears of the dual-pinions planetary gearset and other basic planetary gearset are connected with each other for simultaneous rotation. The carrier of the other basic planetary gearset is brakeable to give second forward speed, and the sun gears of the other basic planetary gearset and dual-pinions planetary gearset are brakeable to give third forward speed and the last mentioned sun gears are connectable to the input to give fourth forward speed.

1 Claim, 4 Drawing Figures

CHANGE-SPEED TRANSMISSION FOR A PASSENGER AUTOMOBILE

The present invention relates to change-speed transmissions for passenger automobiles, giving four forward speeds and a reverse, comprising a compound gear train constructed of two basic planetary gearsets and a dual-pinions planetary gearset.

A variety of four forward speeds transmissions have thus far been proposed to obtain gear ratios suitable for passenger automobiles. Since gear ratios are based on the primary configuration of the planetary gearset, the intervals between the adjacent gear ratios are generally limited to basic values. Such restrictions become more serious where the design of individual planetary gearsets is standardized based on the standpoints of cost reduction and production simplicity.

It is an object of the present invention to provide a four-speed transmission comprising planetary gearsets, which transmission gives gear ratios suitable for passenger automobiles.

The above features of the present invention will become apparent from the following description taken in conjunction with the accompanying drawings, in which.

Figure 1:
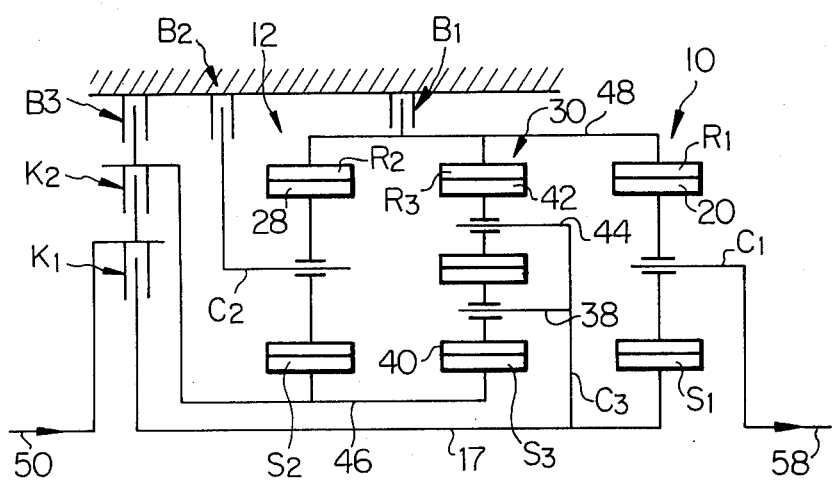
FIG. 1 is a schematic view of an upper half of a preferred embodiment of a four-speed transmission according to the present invention.
Figure 3:
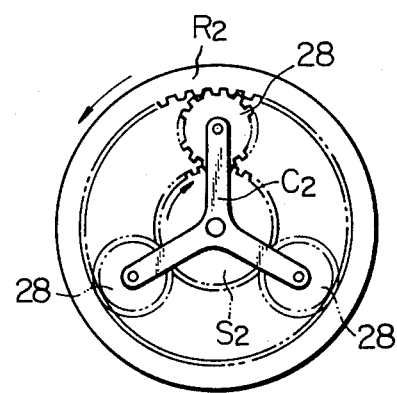
Figure 4:
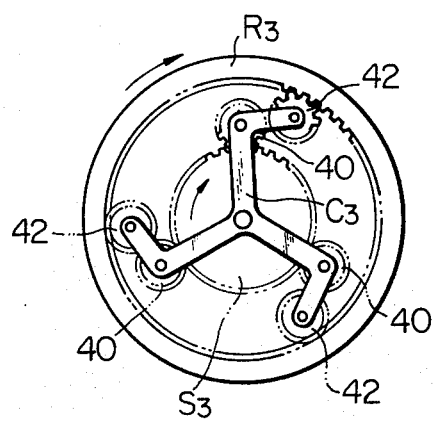

FIG. 3 is a front end view of a representative example of a basic planetary gearset incorporated in FIG. 1; and FIG. 4 is a front end view of a representative example of a dual-pinions planetary gearset incorporated in FIG. 1. The transmission schematically illustrated in FIG. 1 includes a first basic planetary gearset 10 and a second basic planetary gearset 12 (see FIG. 3). Gearset 10 includes a ring gear $R_1$, a sun gear $S_1$, a carrier $C_1$ and planet pinions 20 journaled rotatably upon the carrier $C_1$. Gearset 12 includes a ring gear $R_2$, a sun gear $S_2$, a carrier $C_2$ and planet pinions 28 which are journaled rotatably upon the carrier $C_2$.

Carrier 18 is connected directly to power output shaft 58. Sun gear $S_1$ is splined to or connected to a shaft 17 for simultaneous rotation therewith.

A dual-pinions planetary gearset 30 is located between the first and second basic planetary gearsets 10 and 12. It includes a ring gear $R_3$, a sun gear $S_3$, a carrier $C_3$, planet pinion shafts 38 fixed to the carrier $C_3$ and planet pinions 40 journaled rotatably upon shafts 38 so that they mesh with the sun gear $S_3$ (see also FIG. 4). Pinions 40 mesh with other pinions 42 which also are journaled by means of pinion shafts 44 on the carrier $C_3$. Pinions 42 mesh with the ring gear $R_3$. Carrier $C_3$ is splined to or connected to the shaft 17. The shaft 17 extends through and is rotatable within a hollow shaft 46. Sun gears $S_2$ and $S_3$ are splined to or connected to the hollow shaft 46 for simultaneous rotation therewith. If desired, the sun gears $S_2$ and $S_3$ may be formed as a common sun gear. From the preceding statement it will be noted that planetary gearsets 10, 12 and 30 are arranged concentrically about the shaft 17.

Ring gears $R_1$, $R_2$ and $R_3$ are connected to a drum 48 for simultaneous rotation therewith. A power input shaft 50 is axially aligned with the shaft 17. Power input shaft 50 is connectable to a turbine wheel (not shown) of a torque converter or torque transmitting device, both being not shown.

A forward drive clutch $K_1$ is provided and adapted to engage the power input shaft 50 with shaft 17. A reverse clutch $K_2$ is also provided and adapted to engage the power input shaft 50 with the annular shaft 46.

A first brake $B_1$ is provided and adapted to anchor drum 48. A second brake $B_2$ is adapted to anchor carrier $C_2$ of the second planetary gearset 12. A third brake $B_3$ is adapted to anchor hollow shaft 46.

The gearing is controlled in the following manner: For all forward speeds, the clutch $K_1$ is engaged. First forward speed is obtained when, in addition, the brake $B_1$ is engaged. For second forward speed, the brake $B_2$ is engaged. For the third forward speed, the brake $B_3$ is engaged. For the fourth forward speed, the clutch $K_2$ is engaged. All the planetary gearsets 10, 12 and 30 are thus locked in themselves and rotate as a unit. For reverse gear, the clutch $K_2$ is engaged and the brake $B_1$ applied.

Table

| | $K_1$ | $K_2$ | $B_1$ | $B_2$ | $B_3$ | | Gear Ratio |
|---|---|---|---|---|---|---|---|
| 1st Speed | X | | X | | | $\dfrac{1+a_1}{a_1}$ | 3.22 |
| 2nd Speed | X | | | X | | $\dfrac{a_1-a_2+a_1 \cdot a_3+a_2+a_3}{a_1 \cdot a_2+a_1 \cdot a_3-a_2 \cdot a_3+a_2}$ | 2.00 |
| 3rd Speed | X | | | | X | $\dfrac{1+a_1}{1+a_1-a_3}$ | 1.45 |
| 4th Speed | X | X | | | | 1 | 1.00 |
| Rev. | | X | X | | | $-\dfrac{1+a_1-a_3-a_1 \cdot a_2}{a_1 \cdot a_3}$ | −3.94 |

The sequence for the engagement and disengagement or release of the various clutches and brakes in the transmission of FIG. 1 is illustrated in the above Table. The gear ratios are calculated on the assumption that $a_1=a_2=a_3=0.45$, where: $a_1$ is the ratio of the number of teeth of the sun gear $S_1$ to that of the ring gear $R_1$ in the first basic planetary gearset 10; $a_2$ the ratio of the number of teeth of the sun gear $S_2$ to that of the ring gear $R_2$ in the second basic planetary gearset 12; and $a_3$ the ratio of the number of teeth of the sun gear $S_3$ to that of the ring gear $R_3$ in the dual-pinions planetary gearset 30.

Figure 2:
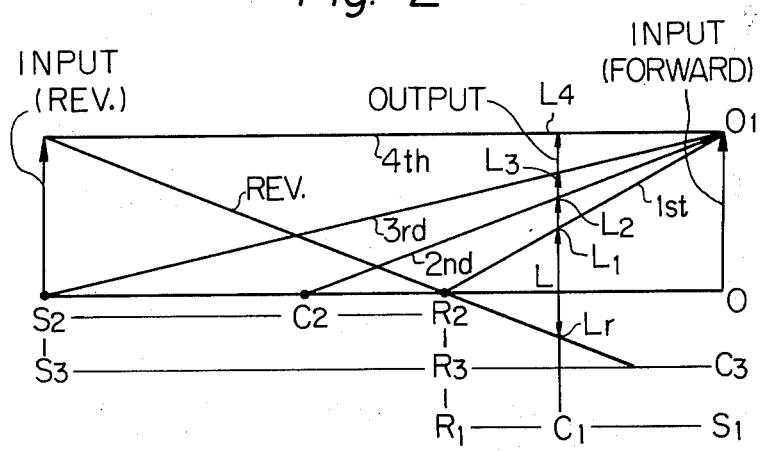
FIG. 2 is a speed chart of the four-speed transmission shown in FIG. 1.

Although the gear ratios can be calculated by the equations in the Table, the same may be obtained with the aid of a speed chart as is familiar to those skilled in the art. FIG. 2 is such a speed chart which visually indicates the reduction speeds of rotary members of the transmission shown in FIG. 1 when the clutches and brakes are engaged or disengaged in accordance with the patterns shown in the above Table. To more clearly understood the graph of FIG. 2, reference may be made to U.S. Pat. No. 3,701,293 or U.K. Patent No. 1,308,001 or German OLS 2,021,368. From the inspection of the chart of FIG. 2 it will be understood that the output speed delivered to the output shaft 58 during the first forward speed is indicated as a vector $LL_1$, the output speed during the second forward speed as a vector $LL_2$, the output speed during the third forward speed as a vector $LL_3$, the output speed during the fourth forward speed (or direct drive) as a vector $LL_4$ and the output speed during the reverse speed as a vector $LL_r$.

Since the torque which is transmitted by the clutches will not be exceeded by the torque to the input shaft as will be readily understood from the inspection of the preceding description and the accompanying drawings, the clutches may be relatively small-sized. This is advantageous in making the change-speed gearing compact.

From the inspection of the Table it will be understood that switching operation between any two forward speeds can be accomplished by engaging one brake and disengaging another one brake. This is advantageous in simplifying a control circuit for the transmission.

What is claimed is:

1. A change-speed transmission, comprising a first basic planetary gearset which has a sun gear, a carrier as an output and a ring gear, the sun gear being connectable by a forward input clutch to an input, the ring gear being brakeable by a first brake; a second basic planetary gearset which has a sun gear, a carrier, and a ring gear, the carrier of said second basic planetary gearset being breakable by a second brake, the sun gear of said second basic planetary gearset being connectable by a second clutch to the input and brakeable by a third brake; and dual-pinions planetary gearset which has a sun gear, a carrier and a ring gear, the sun gear of said dual-pinions planetary gearset being connected to the sun gear of said second planetary gear set for simultaneous rotation therewith, the carrier of said dual-pinions planetary gearset being connected to the sun gear of said first basic planetary gearset for simultaneous rotation therewith, and the ring gears of said first and second basic planetary gearsets and the ring gear of said dual-pinions planetary gearset being connected with each other for simultaneous rotation, in which axes of said first and second basic planetary gearsets and said dual-pinions planetary gearset are alined with the input and output, in which said dual-pinions planetary gearset is located between said first and second basic planetary gearsets, and in which the sun gear of said first basic planetary gearset is connected to the input and the ring gear of said first basic planetary gearset is breakeable during first forward speed; the carrier of said dual-pinions planetary gearset and the sun gear of said first simple planetary gear units are connectable to the input and the carrier of said second basic planetary gearset is brakeable during the second forward speed; the carrier of said dual-pinions planetary gearset and the sun gear of said first basic planetary gearset are connectable to the input and the sun gears of said second basic planetary gearset and said dual-pinions planetary gearset are brakeable during the third forward speed; the carrier of said dual-pinions planetary gearset and the sun gear of said second basic planetary gearset and said dual-pinions planetary gearset are connectable to the input during the fourth forward speed; and the sun gears of said second basic planetary gearset and said dual-pinions planetary gearset are connectable to the input and the ring gears of said first and second basic planetary gearset and said dual-pinions planetary gearset are brakeable during a reverse speed.

* * * * *